Jan. 5, 1937.  A. R. McCOMBS  2,066,993
MOLDING APPARATUS
Filed Nov. 9, 1931    4 Sheets-Sheet 2

Inventor
Arnold R. McCombs
by
Walter F. Kaufman
Attorney

Jan. 5, 1937. A. R. McCOMBS 2,066,993
MOLDING APPARATUS
Filed Nov. 9, 1931 4 Sheets-Sheet 3

Inventor
Arnold R. McCombs
by
Walter F. Kaufman
Attorney

Jan. 5, 1937.  A. R. McCOMBS  2,066,993
MOLDING APPARATUS
Filed Nov. 9, 1931  4 Sheets-Sheet 4

Inventor
Arnold R. McCombs
by
Walter F. Kaufman
Attorney

Patented Jan. 5, 1937

2,066,993

UNITED STATES PATENT OFFICE 2,066,993

MOLDING APPARATUS

Arnold R. McCombs, Lancaster Township, Lancaster County, Pa., assignor to Armstrong Cork Company, Lancaster, Pa., a corporation of Pennsylvania Application November 9, 1931, Serial No. 573,832

12 Claims. (Cl. 18—17)

My invention relates to a molding apparatus particularly adapted for molding cork bodies of special shapes.

It is an object of my invention to provide a molding apparatus in which various parts may be removed and other parts substituted therefor. It is a further object of my invention to provide a molding apparatus which may be adapted to mold articles of different shapes by means of interchangeable mold units. It is a further object of my invention to provide a molding apparatus adapted to force steam through the mass of material being molded so as to attain an exceptionally great degree of uniformity in the completed article. It is a further object of my invention to provide a molding apparatus in which different molding units may be interchanged with a minimum of labor and expense. Other objects of my invention will become apparent to those skilled in the art to which it appertains upon reading the following specification taken in connection with the drawings in which:

Figure 2:
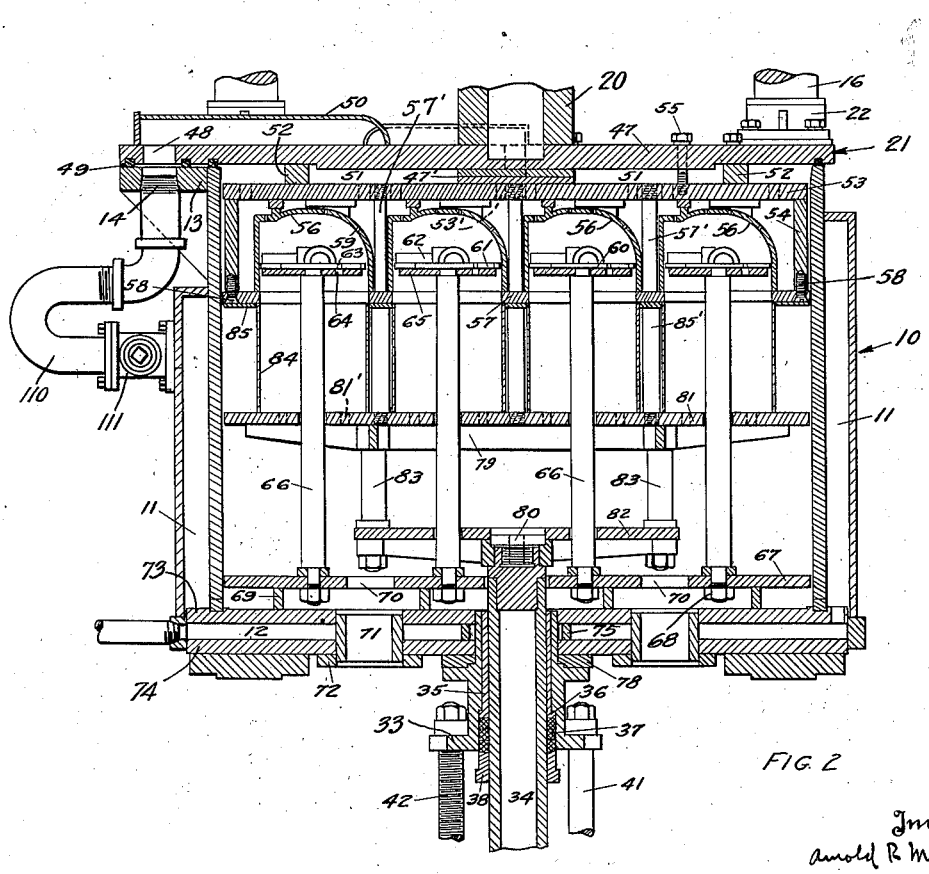
Figure 2 is a vertical sectional view through the molding unit.
Figure 4:
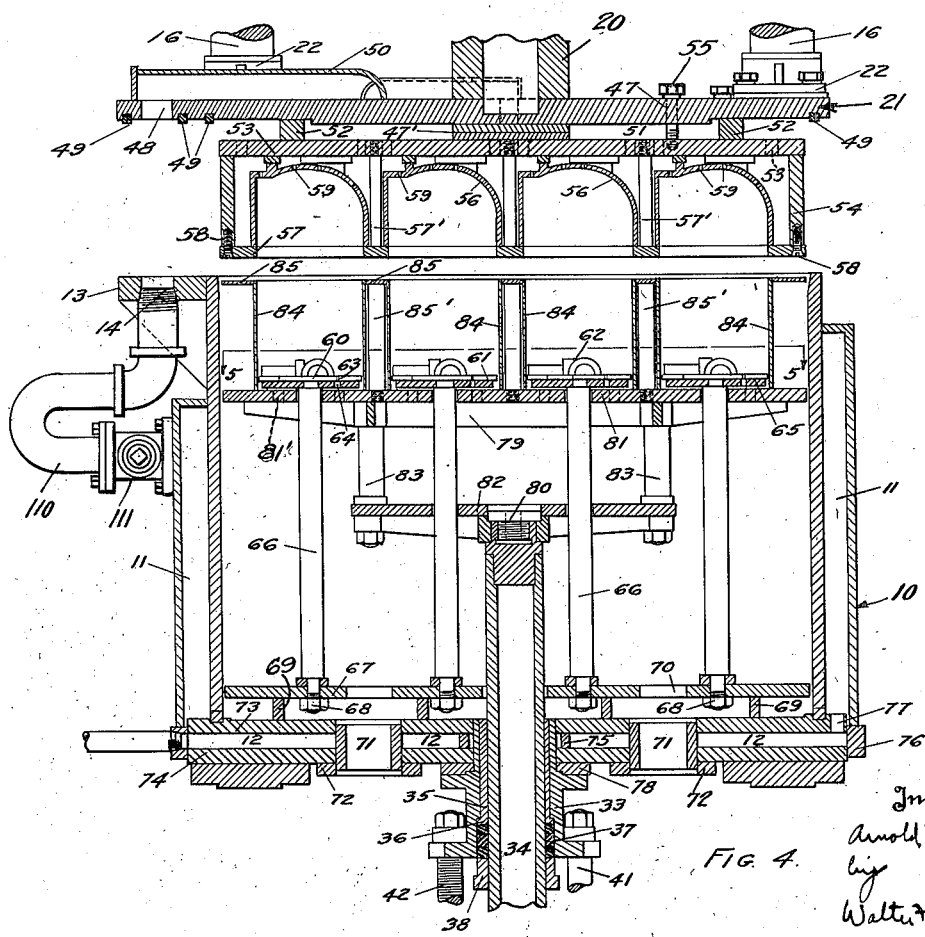
Figure 4 is a view similar to Figure 2 showing the lid assembly in an elevated position.
Figure 7:
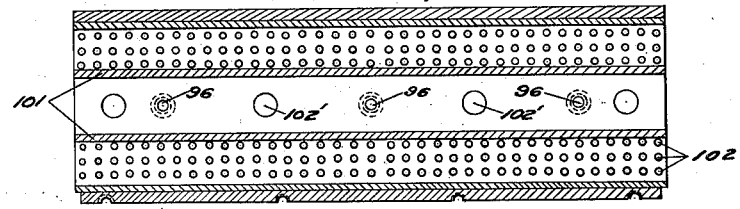
Figure 7 is a section through Figure 6 on the line 7—7.

In the drawings the reference numeral 10 indicates the assembly housing for molds, filling booths and matrices. This housing is surrounded on its sides by a steam jacket 11 and is provided on its bottom with another steam jacket 12. One wall of the housing 10 is provided with a bracket 13 having a threaded opening 14 extending therethrough. A steam line 110 is connected to the opening 14 to provide the steam required in the molding operation. The steam jacket 11 is cut away as indicated in Figures 2 and 4 to allow room for the bracket 13 and for the steam line which is connected to the opening 14.

The steam jackets 11 and 12 may be provided with a number of baffles of any suitable construction to provide equal distribution of the steam over the entire surface of the walls and bottom of the mold. The steam in the jackets compensates for the loss of heat due to radiation and keeps the walls of the mold at a uniform degree of temperature. The steam jackets also permit preheating of the mold as more fully hereinafter described. The high temperature of the walls of the mold prevents the collection of distilled products, such as rosins and gums, on the sides of the molds.

The housing 10 is supported on a base 15 through which columns 16 extend. The columns 16 may be secured to the base 15 in any suitable manner. The columns 16 act as a support for the top assembly and serve as a guide for the lid of the molding units to guide the lid into position in the molding unit. A cylinder support assembly 17 is held in place on the columns 16 by nuts 18. The assembly 17 serves to hold the upper ends of the columns 16 and acts as a base resting on 16 to support an upper cylinder 19 and its internal parts. The cylinder 19 is provided with a lid force ram 20 which forces a lid 21 of the molding unit down and compresses the material in the inside molds so that it is ready for steaming and baking.

Figure 3:
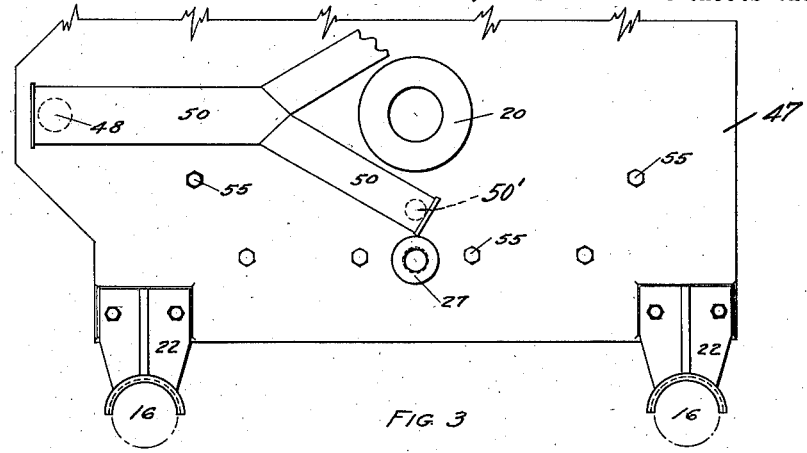
Figure 3 is a top plan view of the molding unit shown in Figure 2.

The lid 21 is provided with brackets 22. The brackets 22 are secured to the lid and are shaped (as shown in Figure 3) to engage the surface of the columns 16 so as to guide the lid to its proper seat on the mold housing 10.

After the molding operation is completed the lid 21 is raised from the mold by means of lid drawback studs 23 secured to the lid 21 by any suitable means. The studs are operated by oil under pressure entering a drawback cylinder 24 forcing a drawback cylinder ram 25 upward. The studs 23 are tied to the ram 25 on the topmost part of the press (not shown). The cylinder 24 has its lower end closed by a plug 26 so as to prevent the escape of the oil. The studs 23 are provided with sleeves 27 which act as stops to limit the upward travel of the lid 21. The sleeves 27 are provided with adjustable nuts 27' so that the sleeves may be fixed in any predetermined position on the drawback studs 23. The sleeves 27 engage with the cylinder support assembly 17 to stop the upward movement of the lid assembly 21 by the ram 25.

The upper cylinder 19 is provided with an internal guide sleeve 28 which serves as a guide for the ram 20. The lower end of the cylinder 19 is recessed on its inner surface to provide a space for a flax packing 29. The packing 29 is held in place by means of a gland 30 and a flange 31. The flange 31 is secured to the lower portion of the cylinder support assembly 17 by means of adjustable studs 32. The flange 31 is recessed on its inner circumference to provide means for supporting the gland 30.

The bottom of the housing 10 has a flange collar 33 that serves as a mounting for a lower cylinder 34. The cylinder 34 contains water at a constant pressure of approximately 1500 pounds per square inch. A sleeve 35, Figure 2, extending between the collar 33 and the cylinder 34 insures a close fit around the cylinder. The lower end of the collar 33 is recessed so as to form an abutment which engages a flange 36 extending around the lower end of the sleeve 35. Asbestos gaskets 37 are held in place against the cylinder 34 by means of the collar 33 and a packing gland 38 to seal the opening in the bottom of the housing, through which the cylinder 34 extends, against the escape of steam. The packing gland 38 is provided with studs 39, shown in Figure 1, by which its position may be adjusted.

Figure 1:
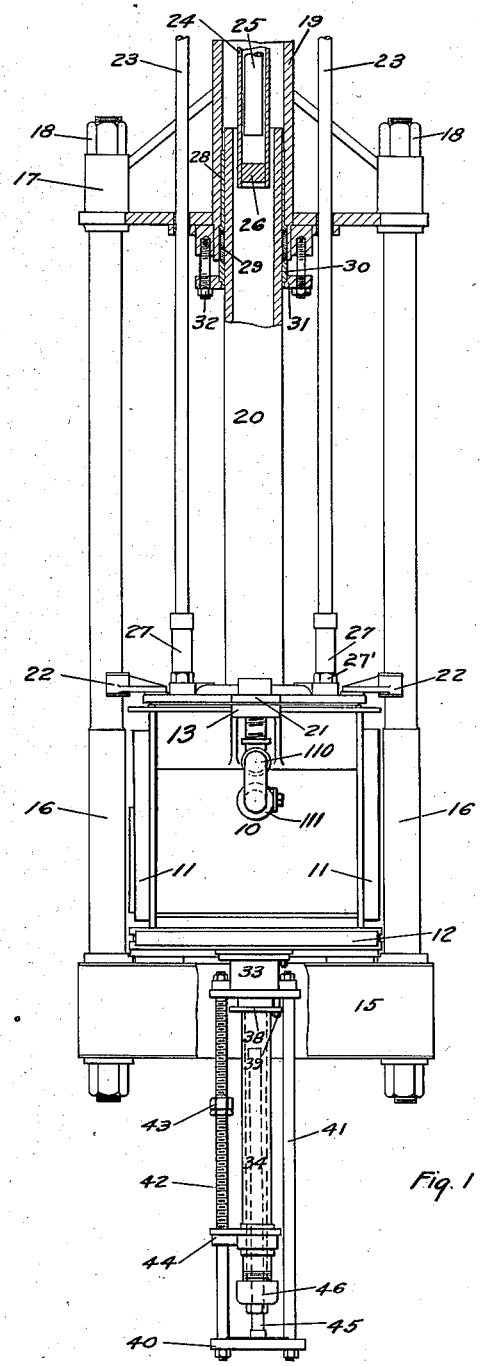
Figure 1 is a side elevation of the molding apparatus.

The cylinder 34 is supported on a bottom plate 40, Figure 1, which is secured in fixed relation to the collar 33 by means of posts 41 and 42. The post 42 is threaded and is provided with an adjustable nut 43 adapted to engage with a bracket 44 secured on the cylinder 34 so as to limit the upward travel of the cylinder 34. It will be seen that the adjustment and the upward travel of the cylinder 34 may be readily changed. The cylinder 34 is provided with a stationary shaft 45 upon which the cylinder 34 is guided in its movement from filling to molding position. The sliding joint between the stationary shaft 45 and the cylinder 34 is sealed by means of the packing nut 46.

The apparatus heretofore described, and illustrated, for the most part, in Figure 1, is permanent and does not require any change regardless of the character of the article to be molded. The housing unit 10 is adapted to receive interchangeable molding units such as those illustrated in Figures 2 and 6. The character of the article to be molded will determine the specific structure of the particular molding unit positioned in the housing 10.

Referring to Figures 2 to 5, I have illustrated a molding unit particularly adapted for molding cork units adapted to serve as insulation for elbow joint pipe fittings. The lid assembly 21 includes a top plate 47 which is attached to the lid force ram 20. The plate 47 is provided with a stiffening plate 47' to help distribute the force when the ram 20 is moved downwardly. The guide brackets 22 are secured to this top plate 47. The top plate 47 is provided with an opening 48 adapted to fit over the steam opening 14 in the bracket 13. The top plate 47 is provided on its under surfaces with asbestos gaskets 49 adapted to seal the joint between the top plate and the top of the housing 10 to prevent the escape of steam or other heating fluid.

The top plate 47 is provided with a steam intake manifold 50 which extends over the opening 48. The manifold 50 is Y-shaped, Figure 3, and conducts the steam through openings 50' in the top plate to a steam chamber 51. The steam chamber 51 is formed by upstanding members 52 which space the top plate 47 from an inside top cover 53. The top cover 53 is provided with downwardly extending flanges 54 forming a rectangular shaped compartment in which mold members are mounted. The inside top cover 53 is provided with a plurality of openings 53' through which steam may pass from the steam chamber 51.

The cover 53 is secured to the top plate 47 by means of the cap screws 55. The cap screws 55 may be removed so as to permit outside mold assemblies 56 and the compartment 53—54 to which they are secured to be removed for replacement by differently shaped molds. The outside molds 56 may be cast or forged. Their inside walls form the outer or exposed side of the molded cork articles. The molds 56 are provided with a plurality of openings 59 through which steam may pass from the under side of the cover 53. The outside molds 56 are secured in place in the inside top cover by means of an apron plate 57 which is secured to the flanges 54 by means of screws 58. A plurality of posts 57' are positioned between the cover 53 and the apron plate 57 to reinforce the latter. These posts 57' are threaded into openings in the top plate 47.

From the foregoing, it will be noted that steam which enters the manifold 50 passes through the openings 50' into the steam chamber 51 and thence through the openings 53' into the compartment formed by the cover 53 and the flanges 54. This compartment is sealed by the apron plate 57 and steam which enters through the openings 53' must, therefore, pass through the openings 59. The steam, however, heats each entire mold assembly 56 and passes through the assembly into direct contact with the cork or material to be molded.

Each inside of the molded article is shaped by a matrix assembly 60. The matrix assembly 60 is formed of a flat plate 61 having an upstanding portion 62 shaped to conform to the shape of the article to be insulated by the molded cork body. The plate 61 is shaped to fit within the inner wall of the outside mold 56. The plate 61 has a plurality of openings 63 which register with openings 64 in a force plate 65 so as to permit the escape of steam that has passed through the mass of cork contained within the mold.

Figure 5:
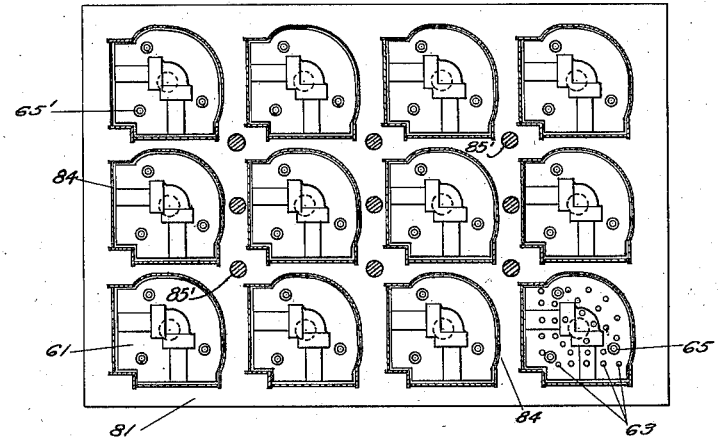
Figure 5 is a section through Figure 4 on the line 5—5.

The steam passing through the cork in the molds causes the cork to expand. The openings 63 are made as small as possible, so that as the cork expands it is not easily forced into the openings. This eliminates the formation of large projections on the surface of the baked cork products. The smaller holes also cause a better distribution of steam because of the larger number of holes in the plate. In Figure 5, I have shown a series of openings 63 in only one plate. It will be understood that each plate 61 is similarly perforated.

The matrix 60 is secured to the force plate 65 by means of screws 65' (shown in Figure 5). Each force plate 65 is secured on the upper end of a stationary matrix force shaft 66. The matrix force shafts 66 support the force plate 65 and the matrix assemblies 60 in fixed relation. The shafts 66 are secured to a base plate 67 by nuts 68. The base plate 67 is spaced from the bottom of the housing 10 by means of members 69. The base plate 67 is provided with openings 70 which register with the conductors 71 extending through the bottom steam jacket 12 and through which the steam from the mold member is exhausted. The openings 71 are provided with flanges 72.

The bottom steam jacket 12 is formed by the bottom 73 of the housing 10 and a lower base plate 74 spaced from the bottom of the housing by members 75. The outer periphery of the steam jacket 12 is sealed by a wall 76. The steam jacket 12 may be innerconnected with the steam jacket 11 as indicated at 77. The joint between the steam jacket 12 and the collar 33 is sealed by a machined boss 78 which may be gasketed if desired.

A filling booth or compartment assembly 79 is secured to the cylinder 34 by means of a screw 80. The filling booth assembly includes a plate 81 having perforations 81' secured to an auxiliary plate 82 by means of studs 83. The auxiliary plate 82 has an opening through which the screw 80 extends to secure the filling booth assembly to the cylinder 34. The plates 81 and 82 are provided with openings through which the stationary matrix force shafts 66 extend. It may be seen by reference to Figures 2 and 4 that the filling booth assembly 79 may be moved vertically without disturbing the position of the matrix assembly 60. The water in the cylinder 34 exerts a constant pressure tending to raise the filling booth assembly, upward movement being limited by the nut 43.

The plate 81 is provided with upstanding plates 84 which constitute walls for the filling booths. The plates 84 are connected at their top by means of an apron plate 85. The plates 84 may be secured to the plate 81 in any suitable manner. Posts 85' are threaded into openings in the plate 81 to serve as reinforcing means for the apron plate 85. There is a filling booth 84 provided for each mould member and the booths are of the same general outline as the matrices 60, as shown in Figure 5.

The mode of operation of my new and improved mold may best be understood by reference to Figures 2 and 4 of the drawings. Figure 4 shows the mold in position ready to be filled and with the lid assembly in an elevated position. The filling booth assembly is raised to its uppermost position by the pressure of the water in the cylinder 34. The upward travel of the filling booth assembly is governed by the position of the adjustable nut 43 on the post 42. The plates 84 fit around each of the matrix units 60 to form individual filling booths. The capacity of the filling booths is regulated by the adjustment of the nut 43. The density of the baked cork product may be predetermined by proper adjustment of the capacity of the filling booths.

When the desired amount of cork has been introduced into each of the filling booths, the lid force ram 20 is moved downwardly. The apron plate 57 engages with the apron plate 85 and forces the filling booth assembly 79 downwardly over the stationary matrices 60 to the position indicated in Figure 2 against the constant pressure of the cylinder 34. The movement of the molds 56 coming down over the matrices 60 is such that all corners and edges are compressed firmly, forming strong and well-filled edges. The cork is compressed between the outer mold 56 and the matrix unit 60. Substantially all of the compression is, therefore, taken by the mold members 56 rather than by the filling booths 84.

Steam or other heating fluid is then admitted through the steam intake manifold 50 and is forced through the mass of cork particles in the mold and exhausted through the openings 71 in the bottom of the housing 10. The steam may be forced to pass through the steam jackets 11 and 12 before it is admitted to the intake manifold 50. This may be readily effectuated by introducing the steam into the jacket 12 and thence through the jackets 11 and into the conductor 110 through the valve 111. It should be noted that steam cannot, by this system, pass through the molding chamber until the lid 21 is seated in position with respect to the housing 10. This insures that the mold will be properly preheated by the chambers 11 and 12 prior to the molding operation. This will insure a constant temperature for the housing 10 because live steam will be constantly circulated through the steam jackets. The steam or other heating fluid passing through the mass of cork particles distills most of the natural resins from the cork and carries such resins away through the steam vents. The mold is sealed at the top in order to force all the steam through the cork. This insures substantially complete removal of all the natural resins of the cork. The steam also causes the cork particles to expand and aids in the formation of sharp corners and edges for the baked cork body.

When the units have been baked thoroughly the lid assembly 21 is moved upwardly by means of the drawback studs 23. The molded units may then be readily removed from the mold. If the molded units stick in the upper part of the mold when the lid assembly is raised they may be removed by blowing compressed air into the steam conduit through the opening 48. The filling booth assembly 79 is moved to its uppermost position by the constantly exerted pressure of the cylinder 34 and the unit is ready to be filled once more.

If it is desired to mold articles different from those for which the mold shown in Figures 2 and 4 is adapted to form, the cap screws 55 are removed and the compartment 53—54 and its associated mold assemblies is removed as a unit. The matrix units 60 and the filling booth assembly 79 and their associated mechanisms including the supporting plate 67 may be conveniently removed by moving the adjusting nut 43 to its uppermost position on the shaft 42, thus permitting the force shaft 34 to move the entire mechanism upwardly and out of the housing 10. The screw 80 is taken out and the entire filling booth assembly 79 is removed as a unit. It will be understood that when the filling booth assembly 79 is removed, the plate 67 will also be carried with it due to contact of the matrices 60 with the plate 81 of the filling booth assembly. In other words, the entire mechanism within the housing may be conveniently removed substantially as a unit. The filling booth assembly and the inside top cover may then be replaced by elements shaped to mold some other article. By installing a suitable flat plate on the cylinder 34 and securing another flat plate to the top plate 47, the molding apparatus will be adapted to form corkboard of any desired thickness and corresponding in size to the area of the mold.

Figure 6:
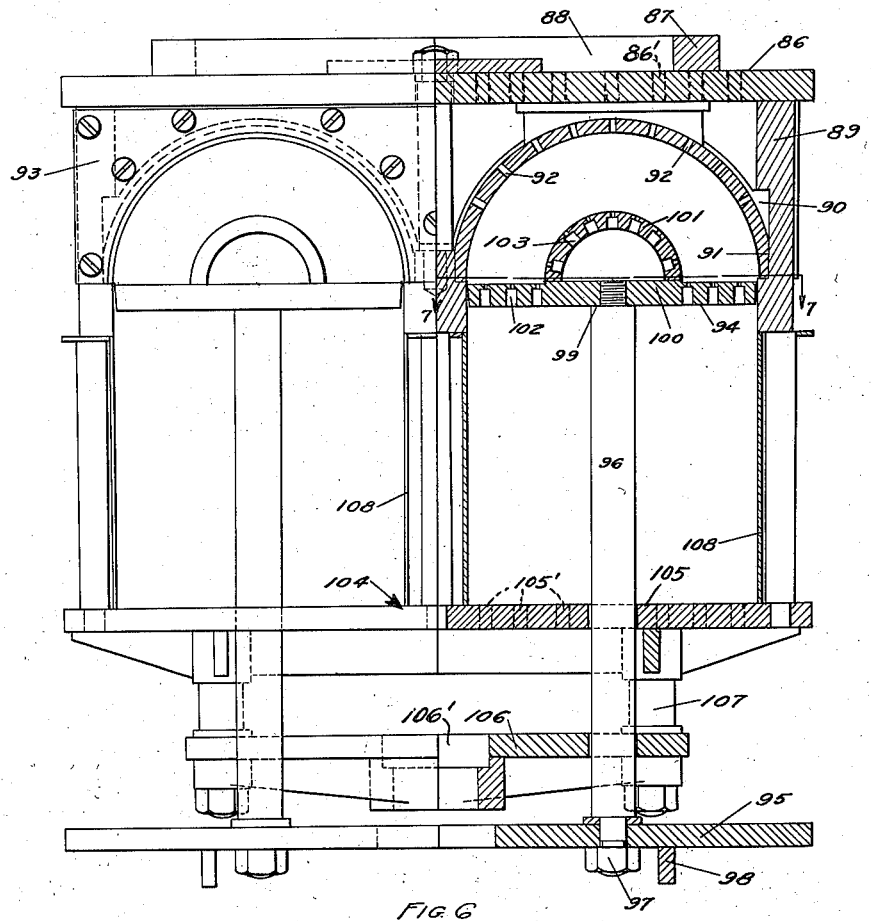
Figure 6 is a view (partly in end elevation and partly in section) of a molding unit that is interchangeable with the molding unit shown in Figures 2 to 4.

In Figure 6 I have illustrated a mold unit particularly adapted to mold cork logs. The unit is provided with an inside top cover 86. The unit 86 is provided with an upstanding flange 87 which contacts with the lid top plate 47 (shown in Figure 4) to form a steam chamber 88. The top cover 86 is provided with openings 86' through which the steam may be forced. The cover 86 has downwardly extending flanges 89 which are recessed as indicated at 90 to support an outside mold 91. The mold 91 is provided with a plurality of steam openings 92 by means of which steam may be forced into the molding chamber in the same manner as described in connection with Figures 2, 4, and 5. The space between the outer mold 91 and the cover 86 is closed by means of a face plate 93.

Matrix assemblies 94 are supported on a base plate 95 by means of the stationary matrix force shafts 96. The shafts 96 are secured to the base plate 95 by means of nuts 97. The base plate 95 is supported on the bottom of the housing 10 by means of members 98. The upper end of the shaft 96 is recessed to form a shoulder 99 upon which the matrix assembly 94 is secured.

Each matrix assembly consists of a flat plate 100 and a curved plate 101 which forms the inside surface of the molded article. These plates 100 and 101 are provided with steam openings 102 and 103 whereby steam forced into the molding chamber through the openings 92 may be exhausted. The plate 100 is also provided with holes 102' (shown in Figure 6) to allow the passage of the steam that has passed through the openings 103.

Filling booth assembly 104 consists of a plate 105 having openings 105' for the escape of steam, secured to an auxiliary plate 106 by studs 107. The auxiliary plate 106 has an opening 106' through which a screw may be passed to secure the plate 106 to the cylinder 34 in the manner shown in Figures 2 and 4. The plates 105 and 106 are provided with openings through which the matrix force shafts 96 extend. The plate 105 is provided with upstanding walls 108 which form the filling booth or compartment. When the lid assembly is raised and the filling booth assembly 104 is forced up by the cylinder 34 the walls 108 form a filling booth about the matrix unit 94 which is illustrated in molding position, Fig. 6. The cork is placed in this filling booth in any suitable manner and the apparatus is operated in the same manner as described for the other figures.

It will be seen that I have described a molding apparatus in which a plurality of molds may be used interchangeably. Although I have disclosed only two specific forms of molds, the number of such molds which may be used is practically unlimited.

The method of molding cork bodies for which my apparatus is particularly adapted is described more specifically and claimed in the application of Louis R. Lee, Serial No. 15,043, filed April 6, 1935, as a division of application Serial No. 573,834, filed November 9, 1931, which earlier filed application also discloses the method as well as the article.

Although I have described my invention in great detail, it will be understood that various modifications may be made without departing from the spirit or scope of my invention and do not desire to be bound by the specific details of construction disclosed except as limited by the appended claims.

I claim:

1. In an apparatus for molding cork, the combination of a housing, a stationary mold member therein, a filling compartment cooperating with said mold member and displaceable with respect thereto, a movable mold member and means for causing relative movement between said mold members and simultaneous displacement of said filling compartment.

2. In an apparatus for molding cork, the combination of a housing, a stationary mold member therein, a filling compartment associated with said mold member and displaceable with respect thereto, means for controlling the position of said compartment with respect to said mold member, whereby the effective volume of said filling compartment may be varied, a movable mold member and means for causing relative movement between said mold members.

3. In an apparatus for molding cork, the combination of a housing, a mold member therein, a filling compartment associated with said mold member and displaceable with respect thereto, said compartment adapted to hold a predetermined quantity of comminuted cork to be compressed and molded, a movable mold member having a cavity adapted to receive and mold the cork contained in said filling compartment, means for causing relative movement between said mold members, and means engageable with the filling compartment upon relative movement of the mold members to effect displacement of the compartment and transfer of cork contained therein into the movable mold member.

4. In an apparatus for molding cork, the combination of a housing, a stationary mold member therein, a filling compartment cooperating with said mold member and displaceable with respect thereto, means normally urging said filling compartment into cooperative relationship with said mold member, a movable mold member and means for causing relative movement between said mold members.

5. In an apparatus for molding cork, the combination of a housing, a stationary mold member therein, a filling compartment associated with said mold member and displaceable with respect thereto, said filling compartment adapted when positioned about said mold member to form an open topped chamber for the reception of granulated cork, a movable mold member adapted to cooperate with said first named mold member to form a molded article, means for causing said movable mold member and said filling compartment to move as a unit, whereby the granulated cork contained in said filling compartment is transferred to said movable mold member and compressed therein.

6. In an apparatus for molding cork articles, the combination of cooperating mold members positioned within a housing, a jacket for heating said housing and mold members and means for injecting heating fluid into and through said housing and said cooperating mold members after passage through said jacket.

7. In an apparatus for molding cork articles, the combination of opposed mold members, one movable relative to the other, a filling compartment forming with the stationary mold member an open topped chamber adapted to receive cork to be molded, pressure means for causing relative movement between said mold members, said pressure means being effective for causing displacement of said filling compartment with respect to said stationary mold member.

8. In an apparatus for molding cork, the combination of a jacketed housing, a plurality of stationary mold members having openings therein, said mold members being mounted on a removable plate within said housing, displaceable filling booths surrounding said mold members and normally urged into cooperative relationship therewith, a closure for said housing, perforate molding cavities secured to said closure and positioned for cooperation with said stationary mold members to form molding chambers, pressure means for urging said closure into sealing position with respect to said housing and for urging said mold members into cooperative relationship, means associated with the mold members on said closure effective for displacing said filling booths with respect to said stationary mold members, and means for injecting heating fluid into said molding chambers.

9. In an apparatus for molding cork, the combination of a housing, a stationary mold member therein, a filling booth cooperating with said mold member and displaceable with respect thereto, means normally urging said filling booth into cooperative relationship with said stationary mold member, a movable mold member, pressure means for urging said mold members into cooperative relationship to form a molding chamber, said pressure means being effective to overcome the means normally urging the filling booth into cooperative relationship with said stationary mold member whereby said filling booth is displaced with respect thereto.

10. In an apparatus for molding cork, the combination of a jacketed housing, a lid assembly for the housing including a plurality of open ended, perforate mold members, and an apron plate surrounding said members at the open end thereof to form a steam chamber in which said mold members are positioned, a matrix member for each mold member adapted to be positioned within the open end of its corresponding mold member to form a molding chamber, means for injecting heating fluid into the jacket and into the steam chamber prior to passage through the molding chambers.

11. In an apparatus for molding cork, the combination of a jacketed housing, a lid assembly for the housing having a port communicating with a fluid heat injector therein, a steam chamber communicating with the injector, a perforate mold member positioned in the steam chamber, and means for conveying heating fluid from the jacket to a port in the housing, the port in the lid assembly adapted to be positioned in cooperative relationship with the port in the housing only when the lid assembly is positioned on the housing whereby heating fluid may be passed from the jacket to the injector and thence into the steam chamber and through the mold chamber.

12. In combination with apparatus for molding cork having a perforate mold member and a perforate matrix member adapted to form, in cooperation a molding chamber, a substantially steam tight housing for the mold member forming a steam chamber therearound and means for injecting steam into the steam chamber prior to passage through the molding chamber.

ARNOLD R. McCOMBS.

CERTIFICATE OF CORRECTION.

Patent No. 2,066,993.  January 5, 1937.

ARNOLD R. McCOMBS.

It is hereby certified that error appears in the printed specification of the above numbered patent requiring correction as follows: Page 2, second column, line 18, for the words and numeral "top plate 47" read cover 53; line 31, for "Each" read The and line 32, for "The" read Each; and that the said Letters Patent should be read with these corrections therein that the same may conform to the record of the case in the Patent Office.

Signed and sealed this 16th day of March, A. D. 1937.

(Seal)

Henry Van Arsdale
Acting Commissioner of Patents.